United States Patent
Givargis

(10) Patent No.: US 10,216,627 B1
(45) Date of Patent: Feb. 26, 2019

(54) TREE STRUCTURE SERIALIZATION AND DESERIALIZATION SYSTEMS AND METHODS

(71) Applicant: Levyx, Inc., Irvine, CA (US)

(72) Inventor: Tony Givargis, Irvine, CA (US)

(73) Assignee: Levyx, Inc., Irvine, CA (US)

( * ) Notice: Subject to any disclaimer, the term of this patent is extended or adjusted under 35 U.S.C. 154(b) by 171 days.

(21) Appl. No.: 15/345,903

(22) Filed: Nov. 8, 2016

(51) Int. Cl.
*G06F 12/00* (2006.01)
*G06F 12/06* (2006.01)

(52) U.S. Cl.
CPC .. *G06F 12/0646* (2013.01); *G06F 2212/1044* (2013.01)

(58) Field of Classification Search
CPC .............. G06F 12/0646; G06F 2212/1044
See application file for complete search history.

(56) References Cited

U.S. PATENT DOCUMENTS

| | | | |
|---|---|---|---|
| 5,909,688 A * | 6/1999 | Yoshioka | G06F 17/30958 |
| 7,058,785 B1 | 6/2006 | Ochotta | |
| 7,246,124 B2 | 7/2007 | Koskas | |
| 7,870,359 B2 | 1/2011 | Challenger et al. | |
| 8,156,156 B2 | 4/2012 | Ferragina et al. | |
| 9,154,159 B2 | 10/2015 | Liu | |
| 2002/0087596 A1 | 7/2002 | Lewontin | |
| 2011/0264819 A1 | 10/2011 | Srinivasan et al. | |
| 2014/0067870 A1 * | 3/2014 | Chandrasekhar | G06F 17/30327 707/797 |
| 2014/0075144 A1 * | 3/2014 | Sanders | G06F 12/02 711/170 |
| 2015/0378889 A1 | 12/2015 | Hulbert et al. | |
| 2016/0170896 A1 | 6/2016 | Steiss | |
| 2017/0249781 A1 * | 8/2017 | Wald | G06T 17/005 |

OTHER PUBLICATIONS 7.3 Arrays, Pointers, Pointer Arithmetic (Year: 1994).*
Data Structures—Simplified (Year: 2012).*

* cited by examiner

*Primary Examiner* — Gurtej Bansal
(74) *Attorney, Agent, or Firm* — Fish IP Law, LLP

(57) ABSTRACT

An improved persistent memory process is disclosed that persists a traversable data structure by converting the traversable data structure into one or more traversable array structures that are saved on a secondary memory. The traversable array structure could be rapidly traversed and maintained, and can be used to restore one or more portions of the traversable data structure.

12 Claims, 9 Drawing Sheets

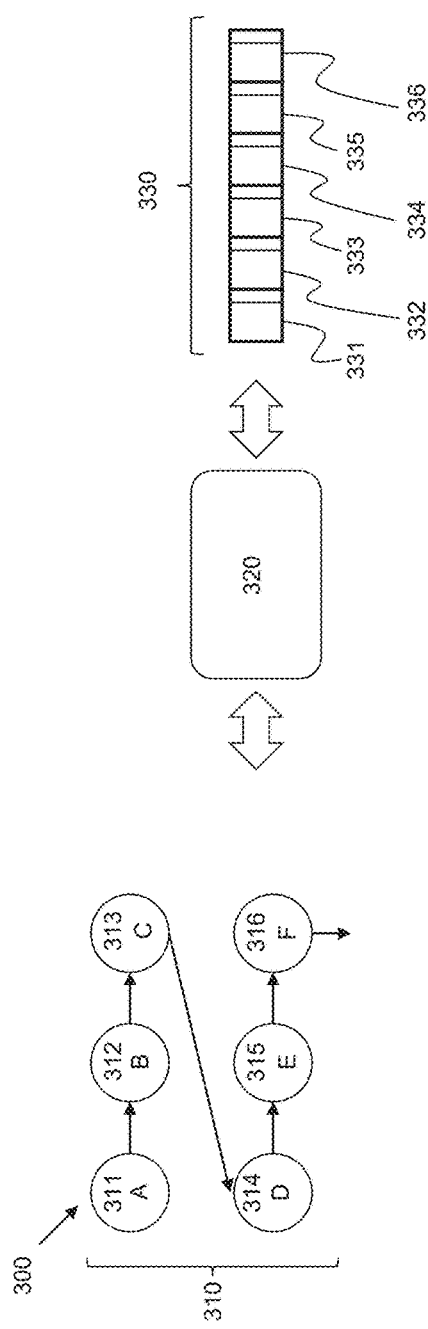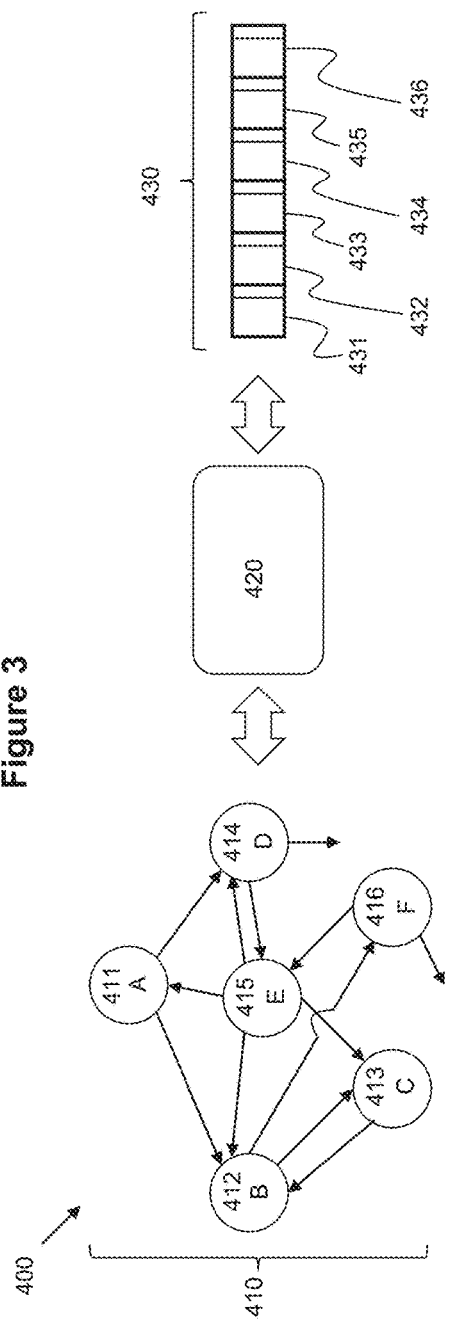

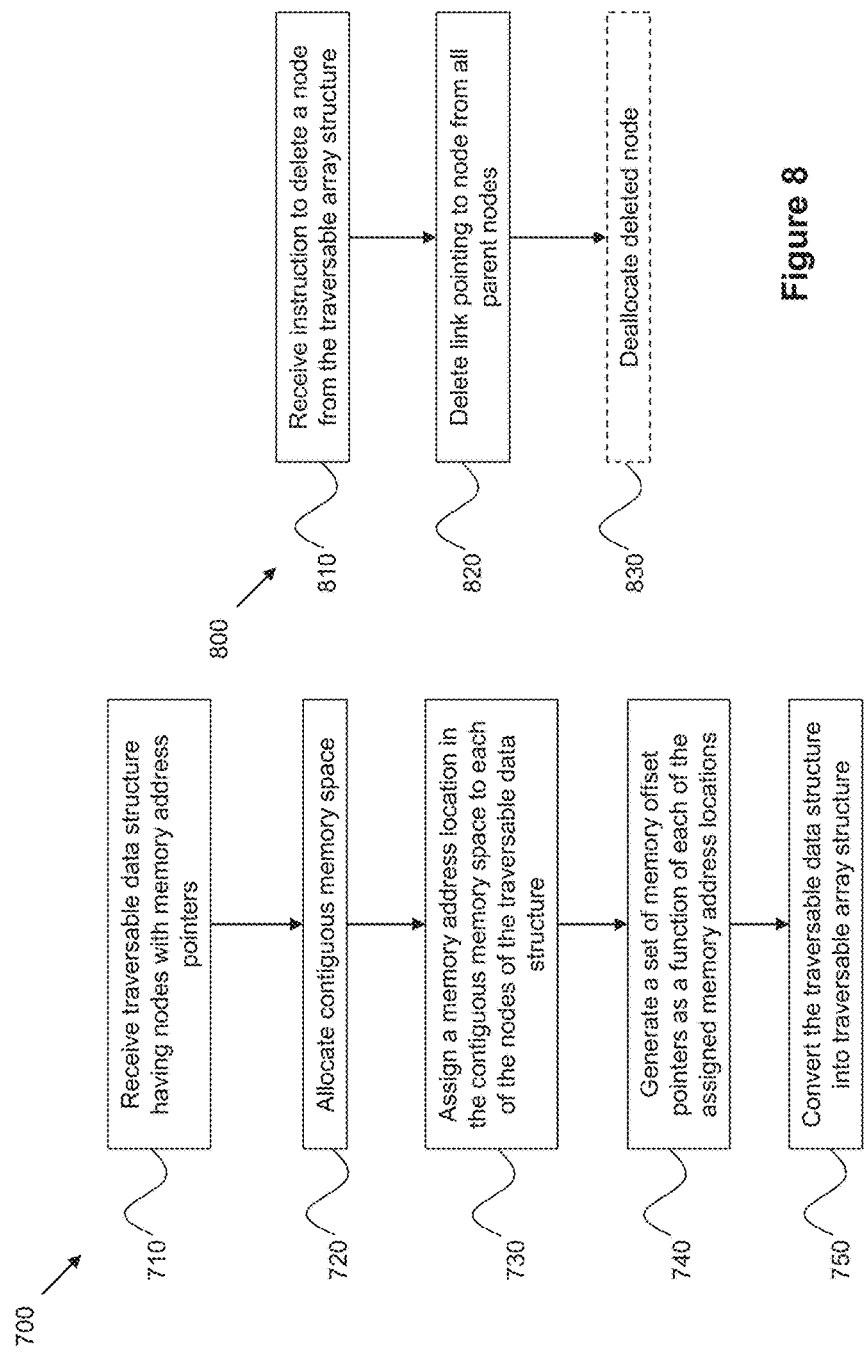

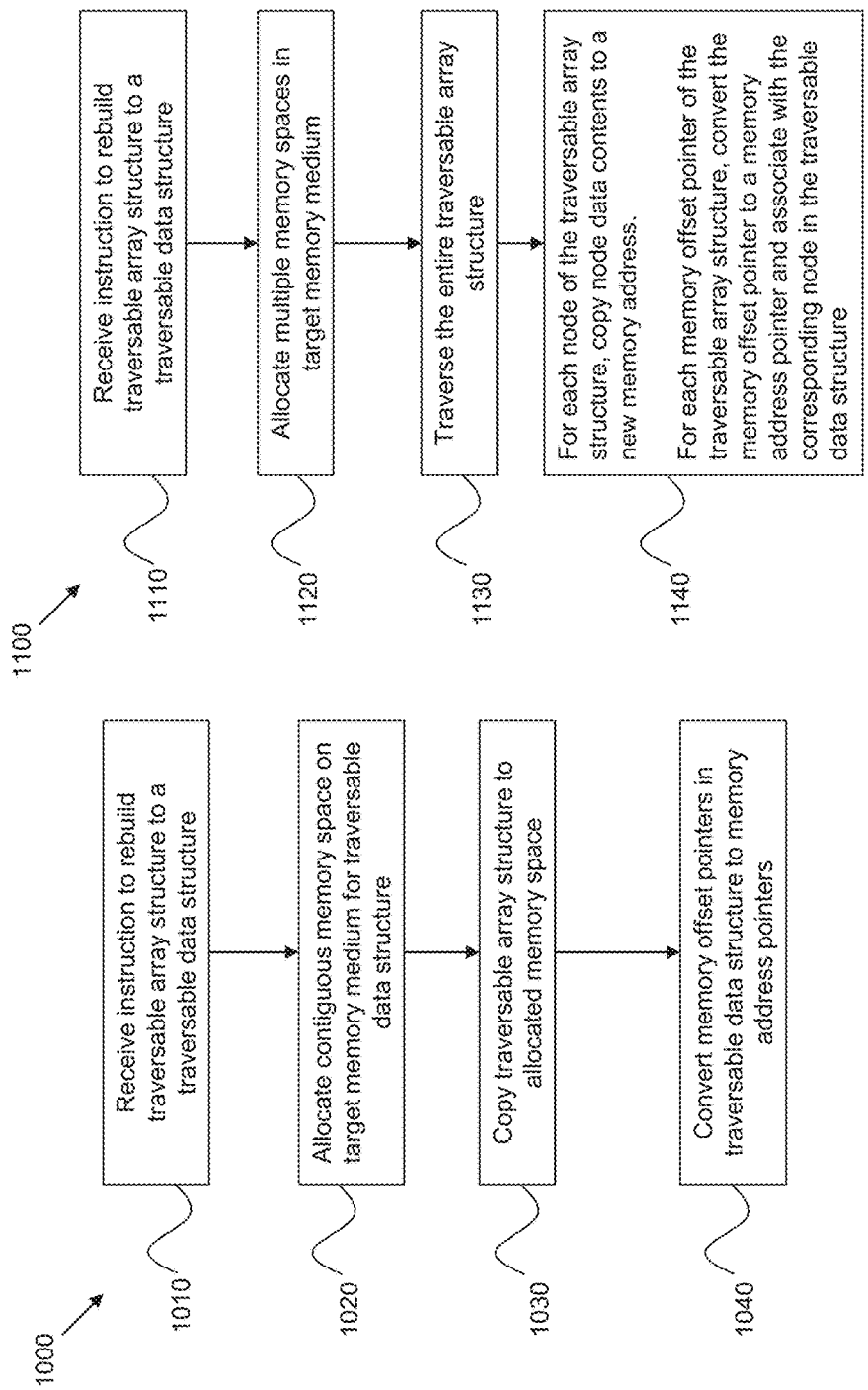

TREE STRUCTURE SERIALIZATION AND DESERIALIZATION SYSTEMS AND METHODS

FIELD OF THE INVENTION

The field of the invention is electronic data structures.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The amount of information archived on computer storage is constantly increasing. Storing and sorting increasing amounts of information can be time-consuming for even the most advanced computer systems without systems and methods for optimizing methods to store and retrieve that data efficiently. Volatile memory structures tend to be fast, but have limited storage capabilities, while persistent memory structures tend to be slower, but have large storage capabilities. Ensuring persistence of data stored in volatile memory structures could hamper the performance of a computer system, particularly when such persistence requires multiple data transactions with slower persistent memory structures.

U.S. Pat. No. 7,058,785 to Ochotta teaches a system that manages persistent data objects between persistent storage and a volatile memory. Ochotta generates persistent storage addresses from persistent pointers by multiplying the persistent pointer value by an integer multiplier. Using such multipliers allows data to be stored and retrieved rapidly from persistent memory, however such multipliers is very space-inefficient for the persistent memory and cannot always be utilized when the resultant address is already allocated.

U.S. Pat. No. 7,870,359 to Challenger teaches a system that manages persistent data objects between persistent storage and a volatile memory by maintaining header pointers in a contiguous area of the memory so that they can be accessed and changed rapidly. However, by Challenger's system requires the system to repeatedly search back to the header every time a pointer in the persistent memory is referenced, which is time-inefficient and requires large hash tables for pointer storage and lookup.

Thus, there remains a need for improved systems and method to efficiently persist data structures in volatile memory.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which a traversable data structure is copied from a source computer-readable medium to a destination computer-readable medium in a time-efficient manner.

As used herein, a "traversable data structure" is a data structure of nodes that are traversable using a set of memory address pointers. Typically, data is saved in the traversable data structure in a set of nodes which are "traversed" by accessing a first node at a first memory address, reading a memory address pointer associated with the node, and then accessing a second node at the memory address referred to by the memory address pointer. Exemplary traversable data structures include linked lists and k-ary tree structures (binary, ternary), as well as more complex nodal structures that contain circular paths.

The system allocates a memory space for the traversable data structure at a memory address of the destination computer-readable medium. The memory space could be a contiguous region of the destination computer-readable medium. The memory space could also be allocated to hold a maximum capacity for the traversable data structure.

In some embodiments, the traversable data structure does not have a maximum capacity. In those embodiments, the memory space could be allocated to hold a threshold amount of data. The threshold amount of data is preferably larger than the amount of data saved in the traversable data structure, for example 120% of the data saved in the traversable data structure. By allocating extra, unused space, the memory space could be dedicated to hold mirrored data of the traversable data structure throughout a plurality of delete node and add node updates. When the traversable data structure grows to be larger than the threshold amount of data, the system could then allocate a new contiguous memory space at a second memory address of the destination computer-readable medium to hold a new threshold amount of data.

The memory space for the traversable data structure is then configured to hold data from the set of nodes as a traversable array structure. The traversable array structure is preferably configured to hold alternating nodes and associated sets of memory offset pointers, such that each node is immediately followed by an associated set of memory offset pointers. For example, where the traversable data structure is a linked list, the traversable array structure could be configured to have a node, then memory offset pointer, then node, then memory offset pointer, etc. Where the traversable data structure is a binary tree, the traversable array structure could be configured to have a node, then a left memory offset pointer, then a right memory offset pointer, then a node, then another left memory offset pointer, then another memory offset pointer, etc.

As used here, a memory offset pointer is a value that is added to a reference memory address in order to obtain the memory address of the next node. In some embodiments, the memory offset pointer could be offset from the memory address of the memory space. In other embodiments the memory offset pointer could be offset from the memory address of the node that the memory offset pointer is associated with.

Each of the set of nodes of the traversable array structure has a memory address location. Each of the set of nodes of the traversable data structure is assigned a memory address location in the traversable array structure. The system generates memory offset pointers for the traversable array structure as a function of the memory address pointers of the traversable data structure and the corresponding memory address locations for the destination node. In this manner, the system converts the traversable data structure into the traversable array structure, where the traversable array structure comprises the set of nodes that are referenced using the set of memory offset pointers.

When the system receives a request to delete a node from the traversable array structure, the system need not waste time by deallocating the space allocated to the node. Instead, the system could merely delete the memory offset pointer that refers to the node. When the system receives a request to add a node to the traversable array structure, the system could append the node to the end of the traversable array structure, and then overwrite a memory offset pointer to allow a previously existing node to point to the new node. This allows for a fast and efficient method to delete and add nodes to the traversable array structure after it is created.

When the size of the traversable array structure reaches a threshold level, a new contiguous memory space could be allocated and the traversable array structure could be copied to the new contiguous memory space without the deleted nodes, allowing the system to recapture the memory "lost" when nodes were deleted without deallocating the memory space.

Alternatively, when the size of the traversable array structure reaches a threshold level, the existing memory space may be expanded by allocating space adjacent to it such that a new larger continues memory region is formed, allowing the system to continue fast and efficient delete node and add node operations.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

FIG. 3 shows a module programmed to convert a traversable linked list data structure into a serialized format and vice-versa.

FIG. 4 shows a module programmed to convert a traversable data structure having a circular path into a serialized format and vice-versa.

FIG. 7 shows a process used to serialize a non-serialized traversable data structure.

FIG. 8 shows a process used to delete a node from a serialized traversable data structure.

FIG. 10 shows a process used to restore a serialized traversable data structure.

FIG. 11 shows an alternative process used to restore a serialized traversable data structure.

DETAILED DESCRIPTION

Figure 1:
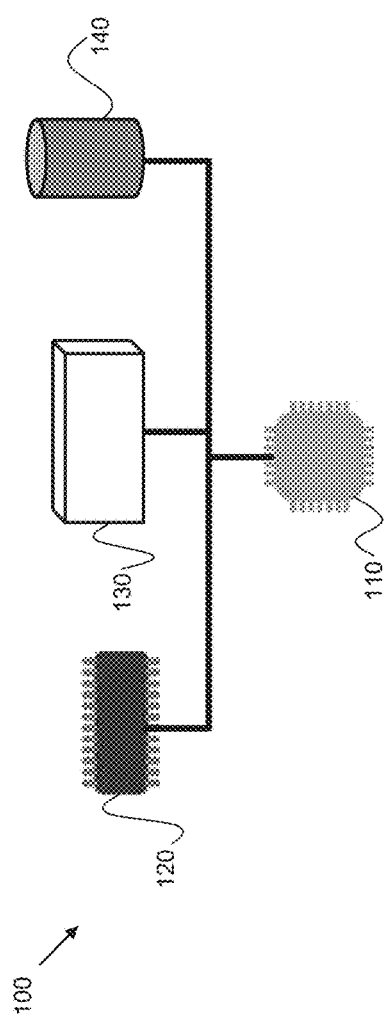
FIG. 1 shows a hardware schematic of exemplary computer hardware suitable for persisting a traversable data structure.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided herein is prior art or relevant to the presently claimed invention, or that any publication specifically or implicitly referenced is prior art.

One should appreciate that the disclosed techniques provide many advantageous technical effects including the ability to drastically speed up searching for values saved in memory by reorganizing how a set of values are saved in memory and are searched in memory.

The inventive subject matter provides apparatus, systems, and methods in which a computer system persists a traversable data structure.

In FIG. 1, an embodiment of a contemplated hardware schematic 100 comprises a processor 110, a first memory 120, a second memory 130, and a third memory 140. While processor 110 is shown to be functionally coupled with first, second, and third memories 120, 130, and 140, respectively, via a system BUS such as a motherboard, processor 110 could be functionally coupled with first, second, and third memories 120, 130, and 140, respectively, via any suitable electronic communication system, such as a wired or wireless network, and may have any number of intervening devices between processor 110 and first, second, and third memories 120, 130, and 140, respectively.

The system is programmed to persist a traversable data structure saved on first memory 120 to an alternative memory, such as second memory 130 and/or third memory 140. Generally, the system is configured such that it is more efficient for processor 110 to access first memory 120 than it is for processor to access second memory 130, and it is more efficient for processor 110 to access second memory 130 than it is to access third memory 140. For example, first memory 120 could be a volatile RAM memory coupled to processor 110 through a computer system BUS, second memory 130 could be a non-volatile SSD (Solid State Drive) coupled to processor 110 through a computer system BUS, and third memory 140 could be a non-volatile SATA drive coupled directly to processor 110 through a computer system BUS or indirectly to processor 110 through a NAS (Network Attached Storage) configuration and then through the computer system BUS. While RAM drives, flash drives, and magnetic drives are shown, first, second, and third memories 120, 130, and 140, respectively, could be any computer-readable storage medium suitable for storing and retrieving electronic data, such as optical drives, chemical drives, quantum drives, mechanical drives, or thermodynamic drives.

Preferably, computer instructions to persist the traversable data structure are saved on a non-volatile memory, such as an SSD or a hard drive, accessible by processor 110. When the computer instructions are executed by processor 110, a run-time instance of the system on processor 110 persists the traversable data structure stored on first memory 120 by storing a persistent version on at least one of second memory 130 and third memory 140. In some embodiments, the persistent version could span more than one memory device, although preferably the persistent version of the traversable data structure is stored on a contiguous section of only one memory device, such as a contiguous area of an SSD. The persistent version is preferably saved in a serialized array structure on the contiguous area of the SSD to improve the efficiency of the system.

The software running on processor 110 preferably updates the persistent version of the traversable data structure whenever the traversable data structure on first memory 120 is updated. If a portion of the traversable data structure on first memory 120 is lost, for example during a power outage where first memory 120 is a volatile RAM memory, then the software running on processor 110 could then restore the traversable data structure on first memory 120 by using the persistent version.

Figure 2:
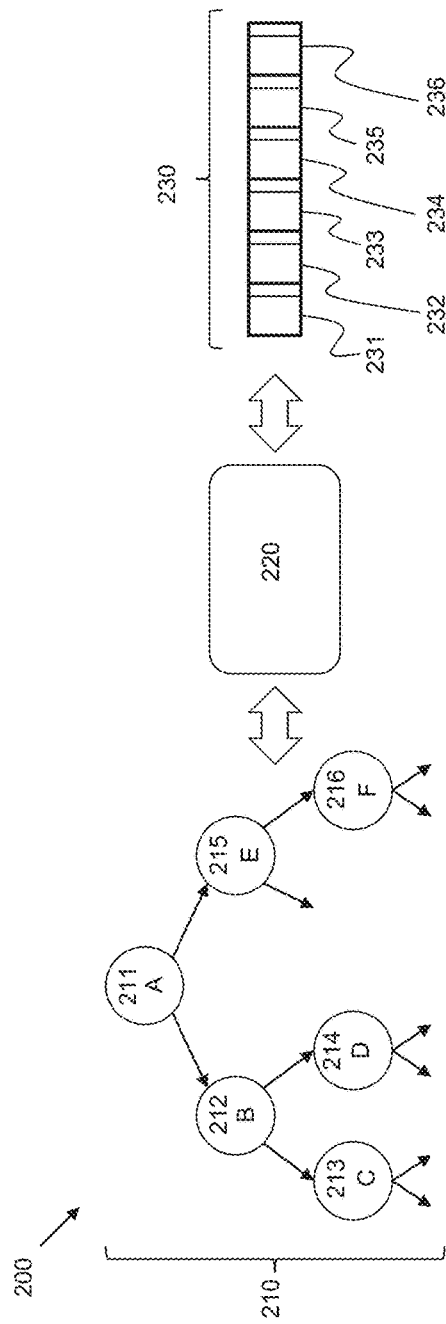
FIG. 2 shows a module programmed to convert a traversable tree data structure into a serialized format and vice-versa.

In FIG. 2, a system 200 is shown, having a module 220 that persists a binary tree structure 210 into a serialized array structure 230. Binary tree structure 210 has nodes 211, 212, 213, 214, 215, and 216 which are saved as array nodes 231, 232, 233, 234, 235, and 236, respectively. Node 211 holds data element "A" and two corresponding memory location pointers—a left memory location pointer that points to the memory location of node 212, and a right memory location pointer that points to the memory location of node 215. Node 212 holds data element "B" and two corresponding memory location pointers—a left memory location pointer that points to the memory location of node 213, and a right memory location pointer that points to the memory location of node 214. Node 213 holds data element "C" and two corresponding memory location pointers—a left memory location pointer that points to a null location, and a right memory location pointer that points to a null location. Node 214 holds data element "D" and two corresponding memory location pointers—a left memory location pointer that points to a null location, and a right memory location pointer that points to a null location. Node 215 holds data element "E" and two corresponding memory location pointers—a left memory location pointer that points to a null location, and a right memory location pointer that points to the memory location of node 216. Node 216 holds data element "F" and two corresponding memory location pointers—a left memory location pointer that points to a null location, and a right memory location pointer that points to a null location.

Module 220 is programmed to convert binary tree structure 210 into a serialized array structure 230 by allocating space for each node, and by generating memory offset pointers for traversable array data structure 230 that correspond to the memory location pointers of binary tree structure 210. For example, node 231 of traversable array structure 230 corresponds with node 211 of binary tree structure 210, node 232 of traversable array structure 230 corresponds with node 212 of binary tree structure 210, and so on. Module 220 copies the data element of node 211, element "A" to the allocated node 231, converts the two pointers to the memory locations of node 212 and 215 to memory offset pointers that can be used to traverse from node 231 to nodes 232 and 235, and stores those memory offset pointers in a space that corresponds with node 231. In the present embodiment, the memory offset pointers are stored in the space immediately following the space allocated to data element "A", however other methods of storing memory offset pointers in a corresponding manner are contemplated, such as by storing two corresponding arrays, one with data elements for each node and another with memory offset pointers for each node (space [1] of the data element array would correspond with node 231, and space [1] of the memory offset pointer array would correspond with node 231), or by storing three corresponding arrays, one with data elements for each node, another with left memory offset pointers for each node, and another with right memory offset pointers for each node (space [1] of the data element array would correspond with node 231, space [1] of the left memory offset pointer would correspond with node 231 and could be used to discern the memory location of node 232, and space [1] of the right memory offset pointer would correspond with node 231 and could be used to discern the memory location of node 235).

Module 220 is also programmed to convert traversable array structure 230 into traversable binary tree structure 210 should the need arise, for example where binary tree structure 210 is saved on a volatile memory and power to the computer system holding the volatile memory is lost. It should be appreciated that, if traversable tree structure 210 were to be saved in an array fashion, traversable tree structure 210 and traversable array structure 230 would be two different ways of drawing the same data structure. Where traversable array structure 230 is saved in a contiguous memory location, module 220 could conceivably restore tree structure 210 by simply copying traversable array structure to the memory location of traversable tree structure 210, and then by converting the memory offset pointers to memory location pointers. It should be appreciated that optimized systems may allocate less space to memory offset pointers than to memory location pointers, which would mean that when copying traversable array structure 230 to the memory location of traversable tree structure 210, that more space should be allocated to the memory offset pointers on the memory location of traversable tree structure 210 such that additional space need not be allocated when converting the memory offset pointers to memory location pointers.

As used herein, a "memory location pointer" is a pointer that holds a virtual or a physical memory address of a memory location. Preferably, the memory location pointer holds a physical memory address to improve efficiency of the system. As used herein, a "memory offset pointer" is a pointer that holds a value that could be plugged into a formula to obtain the virtual or physical memory address of a memory location. Preferably, the formula resolves to a physical memory address to improve efficiency of the system.

In FIG. 3, a system 300 is shown, having a module 320 that persists a linked list structure 310 into a serialized array structure 330. Linked list structure 310 has nodes 311, 312, 313, 314, 315, and 316 which are saved as array nodes 331, 332, 333, 334, 335, and 336, respectively. Node 311 holds data element "A" and a corresponding memory location pointer that points to the memory location of node 312. Node 312 holds data element "B" and a corresponding memory location pointer that points to the memory location of node 313. Node 313 holds data element "C" and a corresponding memory location pointer that points to the memory location of node 314. Node 314 holds data element "D" and a corresponding memory location pointer that points to the memory location of node 315. Node 215 holds data element "E" and a corresponding memory location pointer that points to the memory location of node 316. Node 316 holds data element "F" and a corresponding memory location pointer that points to a null location.

Module 320 is programmed to convert linked list structure 310 into a serialized array structure 330 by allocating space for each node, and by generating memory offset pointers for traversable array data structure 330 that correspond to the memory location pointers of linked list structure 310. For example, node 331 of traversable array structure 330 corresponds with node 311 of linked list structure 310, node 332 of traversable array structure 330 corresponds with node 312 of linked list structure 310, and so on. Module 320 copies the data element of node 311, element "A" to the allocated node 331, converts the memory location pointer to node 212 to a memory offset pointer that can be used to traverse from node 331 to nodes 332, and stores that memory offset pointer in a space that corresponds with node 331. In the present embodiment, the memory offset pointer is stored in the space immediately following the space allocated to data element "A", however other methods of storing memory offset pointers in a corresponding manner are contemplated, such as by storing two corresponding arrays, one with data elements for each node and another with memory offset pointers for each node (space [1] of the data element array would correspond with node 231, and space [1] of the memory offset pointer array would correspond with node 231).

Module 320 is also programmed to convert traversable array structure 330 into traversable linked list structure 310 should the need arise, for example where linked list structure 310 is saved on a volatile memory and power to the computer system holding the volatile memory is lost. It should be appreciated that, if linked list structure 310 were to be saved in an array fashion, linked list structure 310 and traversable array structure 330 would be two different ways of drawing the same data structure. Where traversable array structure 330 is saved in a contiguous memory location, module 320 could conceivably restore linked list structure 310 by simply copying traversable array structure to the memory location of traversable linked list structure 310, and then by converting the memory offset pointers to memory location pointers. Like module 220, it should be appreciated that optimized systems may allocate less space to memory offset pointers than to memory location pointers, which would mean that when copying traversable array structure 330 to the memory location of linked list structure 310, that more space should be allocated to the memory offset pointers on the memory location of linked list structure 310 such that additional space need not be allocated when converting the memory offset pointers to memory location pointers.

In FIG. 4, a system 400 is shown, having a module 420 that persists a traversable data structure 410 into a serialized array structure 430. Traversable data structure 410 has nodes 411, 412, 413, 414, 415, and 416 which are saved as array nodes 431, 432, 433, 434, 435, and 436, respectively. Node 411 holds data element "A" and two corresponding memory location pointers—a first memory location pointer that points to the memory location of node 412, and a second memory location pointer that points to the memory location of node 414. Node 412 holds data element "B" and only one corresponding memory location pointer that points to the memory location of node 416. Node 413 holds data element "C" and only one corresponding memory location pointer that points to node 412. Node 414 holds data element "D" and two corresponding memory location pointers—a first memory location pointer that points to the memory location of node 415, and a second memory location pointer that points to a null location. Node 415 holds data element "E" and three corresponding memory location pointers—a first memory location pointer that points to the memory location of node 412, and a second memory location pointer that points to the memory location of node 411, and a third memory location pointer that points to the memory location of node 414. Node 416 holds data element "F" and two corresponding memory location pointers—a first memory location pointer that points to the memory location of node 415, and a second memory location pointer that points to a null location.

Module 420 is programmed to convert traversable data structure 410 into a serialized array structure 430 by allocating space for each node, and by generating memory offset pointers for traversable array data structure 430 that correspond to the memory location pointers of traversable data structure 410. For example, node 431 of traversable array structure 430 corresponds with node 411 of traversable data structure 410, node 432 of traversable array structure 430 corresponds with node 412 of traversable data structure 410, and so on. Module 420 copies the data element of node 411, element "A" to the allocated node 431, converts the two pointers to the memory locations of node 412 and 414 to memory offset pointers that can be used to traverse from node 431 to nodes 432 and 435, and stores those memory offset pointers in a space that corresponds with node 431. In the present embodiment, the memory offset pointers are stored in the space immediately following the space allocated to data element "A", however other methods of storing memory offset pointers in a corresponding manner are contemplated, such as by storing two corresponding arrays, one with data elements for each node and another with memory offset pointers for each node (space [1] of the data element array would correspond with node 431, and space [1] of the memory offset pointer array would correspond with node 431), or by storing multiple corresponding arrays, one with data elements for each node, another with a first memory offset pointer for each node, a second with a second memory offset pointer for each node, and so on and so forth. In other embodiments, the memory offset pointers are stored with a number of pointers each node has, for example node 411 has two pointers whereas node 412 has one pointer and node 415 has three pointers. The number of pointers will indicate to the system how many traversable paths lead from the node.

Module 420 is also programmed to convert traversable array structure 430 into traversable data structure 410 should the need arise, for example where traversable data structure 410 is saved on a volatile memory and power to the computer system holding the volatile memory is lost. It should be appreciated that, if traversable data structure 410 were to be saved in an array fashion, traversable data structure 410 and traversable array structure 430 would be two different ways of drawing the same data structure. Where traversable array structure 430 is saved in a contiguous memory location, module 420 could conceivably restore traversable data structure 410 by simply copying traversable array structure to the memory location of traversable data structure 410, and then by converting the memory offset pointers to memory location pointers. It should be appreciated that optimized systems may allocate less space to memory offset pointers than to memory location pointers, which would mean that when copying traversable array structure 430 to the memory location of traversable data structure 410, that more space should be allocated to the memory offset pointers on the memory location of traversable data structure 410 such that additional space need not be allocated when converting the memory offset pointers to memory location pointers.

Figure 5A:
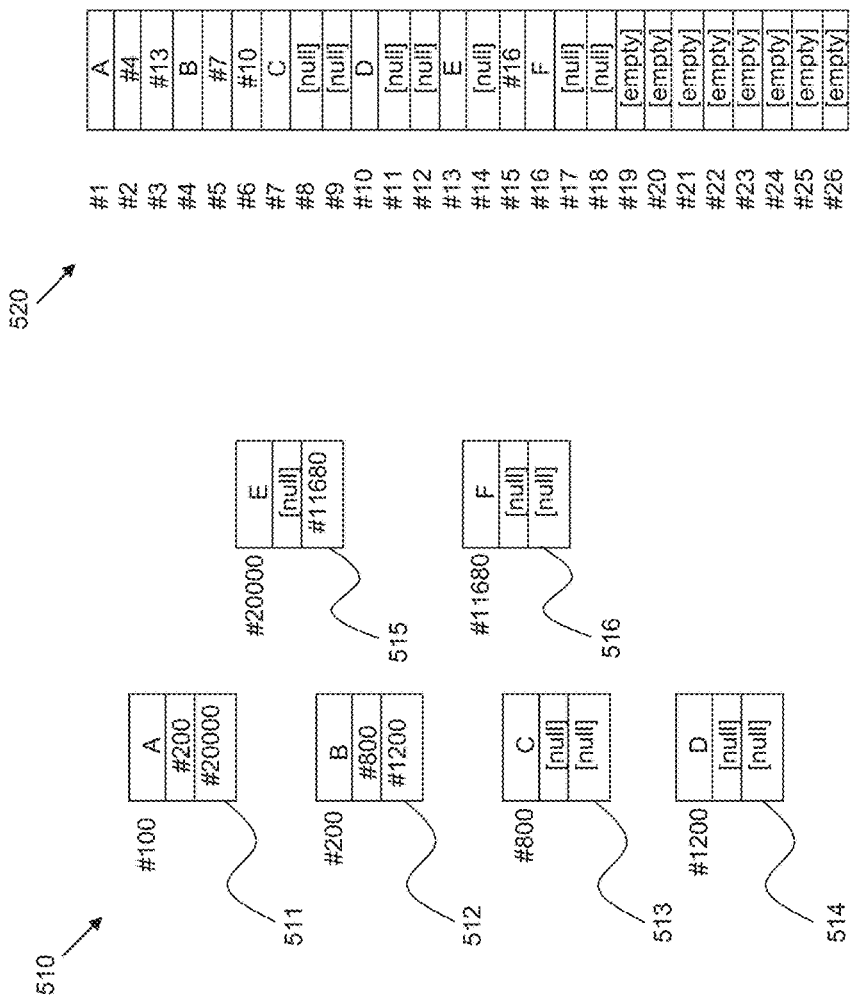
FIG. 5A shows the memory locations of a traversable tree structure saved in a serialized manner using absolute memory locations.
Figure 5B:
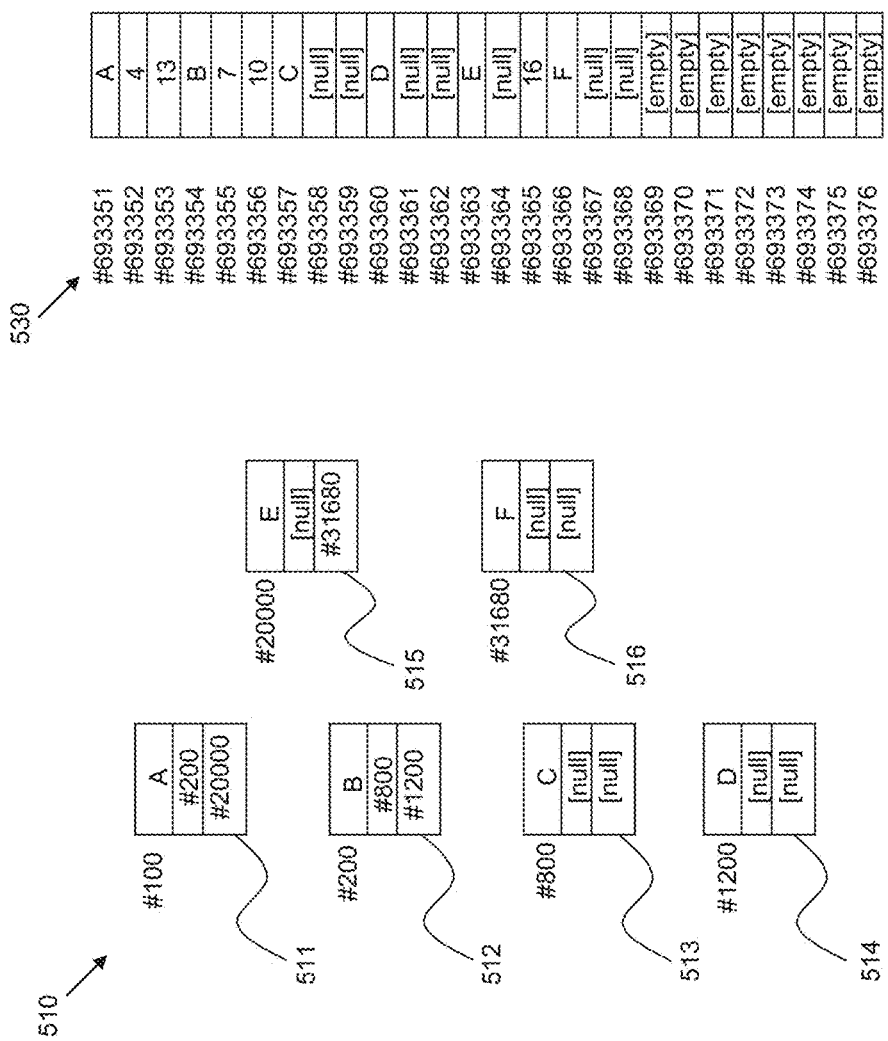
FIG. 5B shows the memory locations of a traversable tree structure saved in a serialized manner using memory offsets calculated from a common memory location.
Figure 5C:
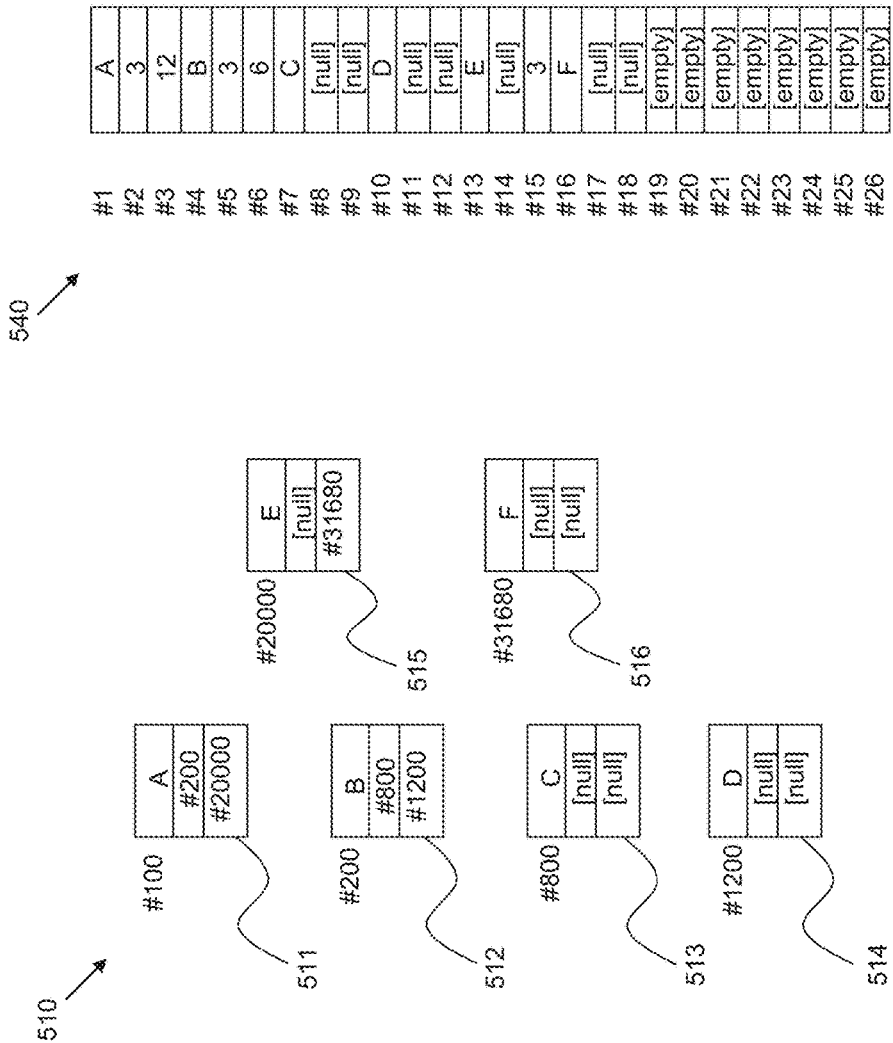
FIG. 5C shows the memory locations of a traversable tree structure saved in a serialized manner using memory offsets calculated from a corresponding memory location.

FIG. 5A-5C show a few different embodiments which can be used to create memory offset locations. In FIG. 5A, traversable tree data structure 210 is saved on first memory 510, which is converted to traversable array structure 230 saved on a contiguous memory location of second memory 520. First memory 510 saves node 211 as memory block 511, having a memory location #100, data element "A", a left memory location pointer pointing to memory location #200, and a right memory location pointer pointing to memory location #20000. Node 212 is saved as memory block 512, having a memory location #200, data element "B", a left memory location pointer #800, and a right memory location pointer #1200. Node 213 is saved as memory block 513, having a memory location #800, data element "C", a left memory location pointer [null], and a right memory location pointer [null]. Node 214 is saved as memory block 514, having a memory location #1200, data element "D", a left memory location pointer [null], and a right memory location pointer [null]. Node 215 is saved as memory block 515, having a memory location #20000, data element "E", a left memory location pointer [null], and a right memory location pointer #11680. Node 216 is saved as memory block 516, having a memory location #11680, data element "F", a left memory location pointer [null], and a right memory location pointer [null]

Module 220 preferably persists binary tree structure 210 by converting binary tree structure 210 into a traversable array structure 230, and by saving traversable array structure 230 to a contiguous memory location, such as contiguous memory location 520. Contiguous memory block 520 is mapped to physical memory locations #1 to #26. Module 220 then maps contiguous memory blocks of the memory locations to the nodes for traversable array structure 230 to be saved. Specifically, module 220 maps binary tree structure node 211 to traversable array structure node 231, which is located at memory location #1, binary tree structure node 212 to traversable array structure node 232, which is located at memory location #4, binary tree structure node 213 to traversable array structure node 233, which is located at memory location #7, binary tree structure node 214 to traversable array structure node 234, which is located at memory location #10, binary tree structure node 215 to traversable array structure node 235, which is located at memory location #13, and binary tree structure node 216 to traversable array structure node 236, which is located at memory location #15.

The memory elements saved in each of the memory blocks of memory 510 are saved to the corresponding memory blocks of 520. Specifically, memory element "A" of memory block 511 is mapped to the memory block located at memory location #1, memory element "B" of memory block 512 is mapped to the memory block located at memory location #4, memory element "C" of memory block 513 is mapped to the memory block located at memory location #7, memory element "D" of memory block 514 is mapped to the memory block located at memory location #10, memory element "E" of memory block 515 is mapped to the memory block located at memory location #13, and memory element "F" of memory block 516 is mapped to the memory block located at memory location #16.

The memory location pointers of memory 510 are then also converted to memory offset pointers of memory 520. Here, the memory offset pointers of contiguous memory location 520 are physical memory location pointers. Module 220 could be programmed to save memory offset pointers as physical memory location pointers where all of the physical memory location values are below a threshold value. Low physical memory location values do not take much space, and do not need to be offset. Here, left memory location pointer #200 is converted to left memory offset pointer #4 (saved at memory location #2), right memory location pointer #20000 is converted to right memory offset pointer #13 (saved at memory location #3), and so on and so forth. The memory offset conversion is performed by using the mapping of nodes from traversable tree data structure 210 to traversable array data structure 230. Since module 220 has mapped binary tree structure node 512 to traversable array structure node 232 saved at memory location #4, left memory location pointer #200 which points to the memory location of binary tree structure node 512 is then converted to memory offset pointer #4.

FIG. 5B persists traversable array structure 230 to contiguous memory location 530, which spans from physical memory location #693351 to #693376. Memory element "A" of memory block 511 is mapped to the memory block located at memory location #693351, memory element "B" of memory block 512 is mapped to the memory block located at memory location #693354, memory element "C" of memory block 513 is mapped to the memory block located at memory location #693357, memory element "D" of memory block 514 is mapped to the memory block located at memory location #693360, memory element "E" of memory block 515 is mapped to the memory block located at memory location #693363, and memory element "F" of memory block 516 is mapped to the memory block located at memory location #693366.

Here, the memory offset pointers of contiguous memory location 530 are each offset from the same memory offset origin #693350. The same type of mapping could be used to create each offset pointer. Module 220 could use the mapping between the binary tree structure 210 and the traversable array structure 230 to calculate the memory offset pointer as a function of the memory location of the destination node. For example, module 220 maps binary tree structure node 211 to traversable array structure node 231, binary tree structure node 212 to traversable array structure node 232, and binary tree structure node 215 to traversable array structure node 235. Node 211 has left memory location pointer to the memory address of node 212 and right memory location pointer to the memory address of node 215. Thus, the left memory offset pointer of traversable array structure node 231 (which corresponds with binary tree structure node 211) is calculated as a function of the memory address of traversable array structure node 232 (which corresponds with node 212). That memory address location is #693354. The memory offset pointer=the memory address location−the offset origin =#693354−#693350=4. The same sort of logic could be applied for each of the memory offset pointers of traversable array structure 230.

FIG. 5B persists traversable array structure 230 to contiguous memory location 540, which, again, spans from physical memory location #1 to #26, as in contiguous memory location 520. However, in this embodiment, module 220 calculates the memory offset pointers for traversable array structure 230 as a function of a different memory offset origin for each node, namely the physical memory address location of each node. Therefore, the memory offset origin for traversable array structure node 231, which is located at physical memory location address #1, would be #1, and the memory offset origin for traversable array structure node 232, which is located at physical memory location address #4.

Again, module 220 could use the mapping between binary tree structure 210 and the traversable array structure 230 to calculate the memory offset pointer as a function of the memory location of the destination node. For example, module 220 maps binary tree structure node 211 to traversable array structure node 231, binary tree structure node 212 to traversable array structure node 232, and binary tree structure node 215 to traversable array structure node 235. Node 211 has left memory location pointer to the memory address of node 212 and right memory location pointer to the memory address of node 215. Thus, the left memory offset pointer of traversable array structure node 231 (which corresponds with binary tree structure node 211) is calculated as a function of the memory address of traversable array structure node 232 (which corresponds with node 212). That memory address location is #4. The memory offset pointer =the memory address location−the offset origin =#4−#1 =3. The same sort of logic could be applied for each of the memory offset pointers of traversable array structure 230.

Figure 6:
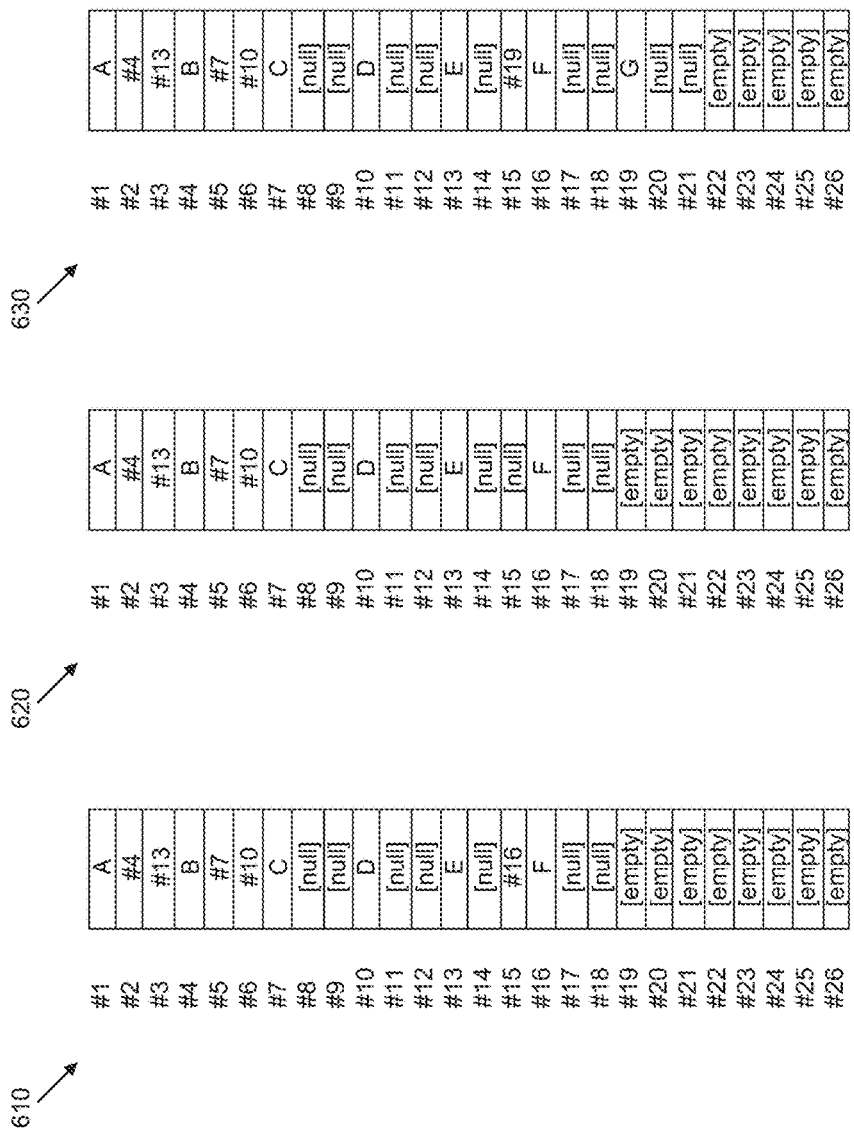
FIG. 6 shows the status of memory blocks through a delete process and an insert process

FIG. 6 shows an embodiment of a contiguous traversable array structure saved on memory 520 undergoing an exemplary delete node procedure and an insert node procedure. State 610 is a copy of memory 520 before any delete or insert procedures have been performed. Memory 520 represents traversable array structure 230 saved in a contiguous memory space using memory offset pointers which are physical address locations.

When the system receives a "delete node 236" instruction, the system finds all pointers to node 236, which is memory offset pointer #16 at memory address location #15 and deletes that memory offset pointer, which in this case overwrites the memory offset pointer to [null]. Node 236 still exists in memory 520, however in state 620, node 236 cannot be accessed since all pointers to node 236 have been deleted.

When the system receives an "insert node having the data value G as a right child of node 235," the system then allocates an empty memory location, such as memory location #19, to a new node. The new node will have the element "G," and a new memory offset pointer will be created in the memory location allocated for the memory offset pointer for the right child of node 235 (which is memory location #15). Data "G" is then written to memory location #19, and the memory offset pointer for memory location #19 is then inserted as a memory offset pointer for the right child of node 235 at memory location #15.

FIG. 7 shows an exemplary process 700 that could be used to serialize a non-serialized traversable data structure. In step 710, the system receives a non-serialized traversable data structure having nodes with memory address pointers, such as binary tree structure 210, linked list structure 310, or traversable data structure 410. During this step, the system typically gleans data about the traversable data structure, such as how much space is taken by elements of the traversable data structure and how many memory address pointers each node has. In step 720, the system allocates a contiguous memory space for the serialized traversable array structure. The system is preferably configured to allocate more contiguous memory space than is necessary to create a serialized copy of the traversable data structure to allow for a plurality of insert node and delete node commands to be executed without needing to allocate more memory for the traversable array structure. In some embodiments, the system could be configured to allocate a pre-set amount of space (e.g. 4 GB for a traversable array structure), and in other embodiments the system could be configured to allocate an amount of space as a function of the size of the traversable data structure (e.g. 2× the size of the amount of memory the traversable data structure currently takes) or as a function of historical loads (e.g. a mean or median of the amount of memory typical traversable array structures require during a specified period of time).

In step 730, the system assigns a memory address location in the contiguous memory space to each of the nodes of the traversable data structure. In some embodiments, the system could traverse the entire traversable data structure and every time a new node is found, a memory address location in the contiguous memory space is assigned to that node. In a preferred embodiment, the system pre-allocates blocks of the contiguous memory space as "array nodes," and then assigns each preallocated array nodes to one of the nodes of the traversable data structure as the system traverses the traversable data structure.

In step 740, the system generates a set of memory offset pointers as a function of each of the assigned memory address locations. Then, in step 750, the system converts the traversable data structure into the traversable array structure by copying the values of the traversable data structure to the correlating nodes of the traversable array structure, and then by copying the generated set of memory offset pointers to the correlating nodes of the traversable array structure. As used herein, copying a memory offset pointer to a correlating node of the traversable array structure comprises copying the memory offset pointer to the section of the contiguous memory space allocated to the correlating memory offset pointer of the node. For example, in some embodiments, the system may allocate corresponding memory offset pointers to be saved in a space immediately after the value of the node of the traversable data structure. In other embodiments, the system may allocate corresponding memory offset pointers to be saved in a separate array that matches the array of node values, such that element [1] of the array of memory offset pointers corresponds to element [1] of the array of node values.

Preferably, after a traversable array structure is constructed in the secondary memory, the system will then persist the traversable array structure by mirroring add/delete instructions that are occurring on the traversable data structure.

FIG. 8 shows an exemplary process 800 to delete a node from the traversable array structure. In step 810, the system receives an instruction to delete a node from the traversable array structure. In step 820, the system deletes all of the links in the traversable array structure that point to the deleted node. Specifically, this means moving, erasing, or otherwise deactivating the memory offset pointer that is used to traverse from another node to the deleted node. (e.g. rendering the memory offset pointer [null]) In some embodiments, the system need not proceed to the next step, and could deallocate the deleted node at another time. In some embodiments, the system could copy a pointer to the deleted node to a "deleted node queue," which will deallocate memory when the system receives a "garbage collection" command. For example, the system might perform multiple deletion and insertion commands in a row, then may remain idle. When the system remains "idle" over a threshold unit of time, the system could then trigger the garbage collection command to deallocate at least a portion of the deallocated node queue. As used herein, an "idle" system means a system that is not over a threshold level of processor saturation. In some embodiments, the system may proceed to optional step 830 after step 810 or step 820, and will deallocate the deleted node.

Figure 9:
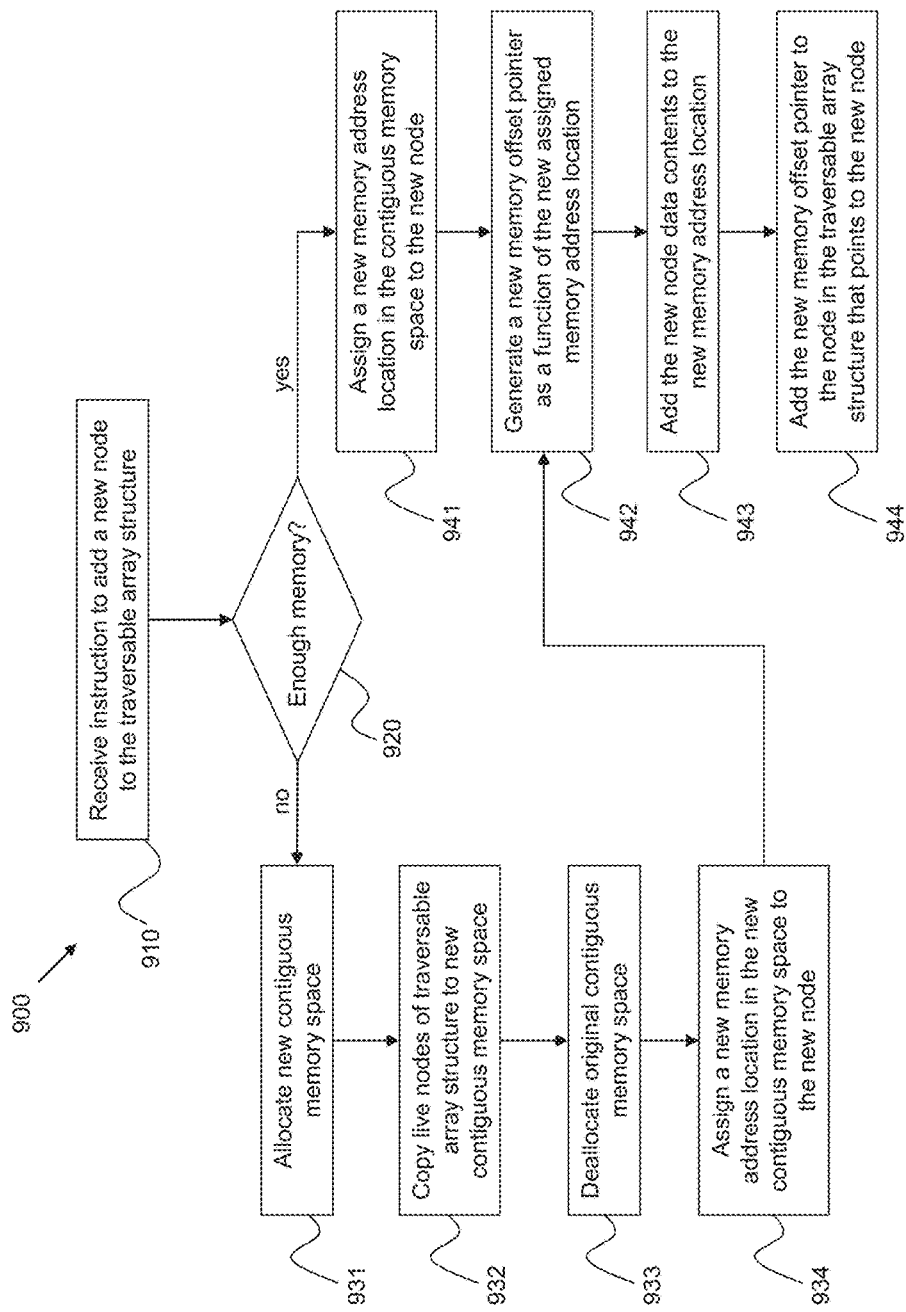
FIG. 9 shows a process used to add a node to a serialized traversable data structure.

FIG. 9 shows an exemplary process 900 to add a new node to the traversable array structure. In step 910, the system receives an instruction to add a new node to the traversable data structure. In step 920, the system determines whether or not the memory space allocated to the traversable array structure has enough memory to add a new node.

If the system determines that there is not enough memory space allocated to the traversable array structure to add a new node, the system may then allocate a new contiguous memory space to the traversable array structure in step 931. In some embodiments, the new contiguous memory space may be larger than the space currently used for the traversable array structure, in other embodiments the new contiguous memory space may be the same size. In some embodiments the system may be programmed to count how many "dead" nodes the traversable array structure contains in order to calculate how much non-deallocated "free space" is within the traversable array structure. If the non-deallocated "free space" is over a certain threshold, the system may be configured to allocate a new contiguous memory space that is the same size as the current contiguous memory space.

In step 932, the system then copies live nodes of the traversable array structure to the new contiguous memory space. As used herein, a "live node" is a node that has not been deleted and the system has saved a direct memory address location pointer (e.g. the system typically saves a memory address location pointer to the head of a linked list or tree to start traversal of the tree) or a memory offset pointer (e.g. in a parent node) that could be used to navigate to the live node. Copying live nodes also includes converting memory offset pointers if they need to be converted. In some embodiments, such as with memory 530 or 540, the memory offset pointers would remain the same and the system need only alter a memory offset origin. In step 933, the system then deallocates the original contiguous memory space, and in step 934, the system assigns a new memory address location in the new contiguous memory address space to the new node.

If, in step 920, the system determines that the memory space allocated to the traversable array structure has enough memory, the system could then assign a new memory address location in the contiguous memory space to the new node in step 941. In either step 934, or in step 941, the system allocates a new memory address location to the new node, and then in step 942, the system generates a new memory offset pointer to the new node as a function of the new assigned memory address location. In step 943, the data contents of the new node are copied into the new node at the new memory address location, and in step 944, the memory offset pointer is added to a parent node, which allows the system to later traverse to the new node.

In step 920, the system may determine that the memory space allocated to the traversable array structure has enough space to insert a new node, but may run out of space soon. When the system detects that the free space is under a certain threshold amount, the system may start to perform steps 931-932 in anticipation of running out of free space at some point in the future. Then, the system could switch to the new traversable array structure at any time without dramatically impacting the performance of insert commands being handled by the system.

FIG. 10 shows an exemplary method 1000 of rebuilding a traversable data structure using a traversable array structure. In step 1010, the system receives an instruction to rebuild a traversable array structure to a traversable data structure. Generally, this may occur where the traversable data structure is saved in volatile memory, and the volatile memory has been power cycled. In step 1020, the system then allocates a contiguous memory space in the target memory medium that is large enough to handle the traversable array structure. The system could then copy the traversable array structure to the allocated memory space to create a traversable data structure that is substantially identical to the traversable array structure. At this point, the system could simply traverse the traversable data structure using the memory offset pointers and use the traversable data structure as-is, but this would require the system to have a hybrid system that is configured to traverse the traversable data structure using both memory offset pointers and memory address location pointers, since new nodes of the traversable data structure would likely use memory address location pointers.

In other embodiments, in step 1040, the system could convert the memory offset pointers in the traversable data structure to memory address pointers as a function of the values of the memory offset pointers. The traversable data structure would then be in a serial array format, but as new nodes are added or old nodes are deleted from the traversable data structure, the traversable data structure would likely lose its serial integrity as memory holes are created by deallocating nodes and new nodes are added in non-contiguous sections of the memory.

FIG. 11 shows another exemplary method 1100 of rebuilding a traversable data structure using a traversable array structure. In step 1110, the system receives an instruction to rebuild a traversable array structure to a traversable data structure. In this embodiment, the system may not have enough space to allocate a contiguous memory space on the target memory medium, or may not be configured to allocate a contiguous memory space. The system could then allocate multiple memory spaces in the target memory medium for the multiple nodes of the traversable data structure. In step 1130, the system could traverse the traversable array structure using the memory offset pointers, and, in step 1140, the system could then copy node data contents to the new memory locations, convert memory offset pointers to memory address location pointers, and could then copy the memory address location pointers to their appropriate nodes.

The invention provides a substantial improvement over existing persistent memory technologies. The invention serializes a non-serialized traversable data structure, which dramatically increases performance of accessing, traversing, adding nodes from, and deleting nodes from the traversable array structure. While the volatile storage medium needs to traverse multiple memory locations in disparate areas of the memory to traverse a non-serialized traversable data structure, the non-volatile storage medium could quickly traverse multiple memory locations in the same contiguous area of the memory to traverse the serialized array data structure. In addition, by using a serialized array data structure for the secondary memory, the memory offsets could be used in a formulaic way to directly access memory address locations mathematically, instead of needing to navigate to a particular memory address location using a hash table. By increasing the performance of the traversable array structure, the system minimizes the inherent delay when using a persistent storage medium, which is typically slower than a volatile storage medium, which helps in maintaining persistence when multiple updates of the non-serialized traversable data structure occur.

The inventive subject matter improves the functioning of any database computer system that requires its memory access to persist by quickly copying and serializing a traversable data structure in a manner that optimizes the speed at which data access commands are processed and prevents time-consuming garbage collection methods from interrupting insert and delete commands from occurring.

Ultimately, the invention improves computer functionality and provides a reduced cost to users.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . . and N, the text should be interpreted as requiring only one element from the group, not A plus N, or B plus N, etc.

What is claimed is:

1. A computer-implemented method for saving a traversable data structure to a computer-readable medium, wherein the traversable data structure comprises a set of nodes traversable using a set of memory address pointers, comprising:

allocating a first contiguous memory space for the traversable data structure in the computer-readable medium at a first memory address;

assigning a memory address location in the first contiguous memory space to each of the set of nodes;

generating a set of memory offset pointers as a function of the set of memory address pointers and the assigned memory address locations;

converting the traversable data structure into a traversable array structure comprising the set of nodes and the set of memory offset pointers;

saving the traversable array structure to the first contiguous memory space, wherein the set of memory offset pointers are saved to memory blocks of the first contiguous memory space; and traversing the traversable array structure by reading a memory offset pointer from a memory block of the first contiguous memory space and adding the memory offset pointer to a memory offset origin to obtain a memory address pointer of a destination node.

2. The computer-implemented method of claim 1, wherein the traversable data structure comprises a linked list.

3. The computer-implemented method of claim 1, wherein the traversable data structure comprises a k-ary tree.

4. The computer-implemented method of claim 1, wherein the traversable data structure comprises a circular path.

5. The computer-implemented method of claim 1, wherein the step of generating the set of memory offset pointers comprises calculating an offset from the first memory address.

6. The computer-implemented method of claim 1, wherein the step of generating the set of memory offset pointers comprises calculating an offset from the memory address location of a correlating node of the set of nodes of the traversable array structure.

7. The computer-implemented method of claim 1, wherein the first contiguous memory space for the traversable array structure is a contiguous region of the computer-readable medium.

8. The computer-implemented method of claim 1, wherein the first contiguous memory space for the traversable data structure is allocated to hold a maximum capacity for the traversable data structure.

9. The computer-implemented method of claim 1, wherein the first contiguous memory space for the traversable data structure is dedicated to the traversable array structure throughout a plurality of delete node and add node updates.

10. The computer-implemented method of claim 1, further comprising:
   receiving a request to delete a node referred to by a memory offset pointer of the set of memory offset pointers; and
   deleting the memory offset pointer from the traversable array structure without also deallocating the node referred to by the memory offset pointer.

11. The computer-implemented method of claim 1, wherein the traversable array structure comprises a contiguous memory of the first contiguous memory space, wherein the contiguous memory comprises alternating nodes and subsets of the set of memory offset pointers.

12. The computer-implemented method of claim 11, further comprising:
   receiving a request to add a node;
   appending the node to an end of the contiguous memory of the first contiguous memory space;
   generating an appended memory offset pointer as a function of the end of the contiguous memory; and
   overwriting an existing memory offset pointer of the traversable array structure with the appended memory offset pointer associated with the appended node.

* * * * *